Patented Dec. 20, 1949

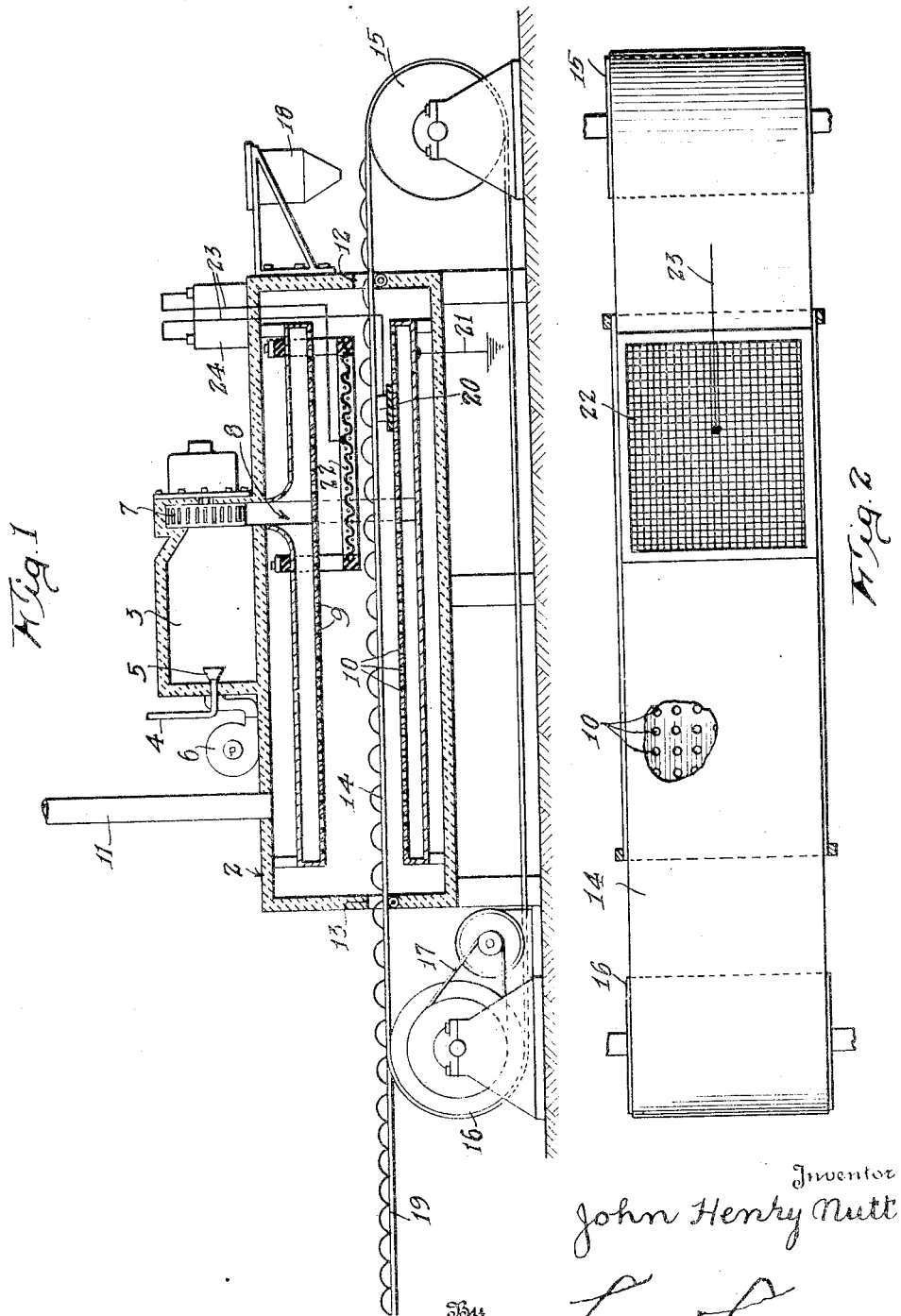

2,491,687

UNITED STATES PATENT OFFICE 2,491,687

APPARATUS FOR BAKING DOUGH PRODUCTS

John Henry Nutt, Los Angeles, Calif.

Application June 26, 1945, Serial No. 601,618

7 Claims. (Cl. 107—54)

This invention relates to a method and apparatus for baking dough products.

One object of the present invention is to provide a method and apparatus for baking dough products by means of which the heat required for baking the products is applied both to the exterior of the products and also generated within the interior of the products.

The process of baking consists generally in the heating of the prepared dough in order to bring about a drying and chemical reaction arising from the leavening properties thereof which result in the "spread" or expansion of the dough. This is brought about by the action of carbon dioxide gas or other expanding agent within the dough, resulting in a porous structure in place of the dense, compact structure.

The usual method of baking dough products in which the heat is applied entirely to the exterior, compels the heat to pass from the outside of the dough products to the center of the products solely by virtue of the conductivity of the dough itself. The conductivity of the dough material is far from perfect and therefore considerable difficulty is experienced in preventing the application of excessive heat to the exterior of the product if the interior is to be completely baked. Many bakery products, such as cookies, crackers and other goods, are irregularly shaped and in order to fully bake one part it is sometimes necessary to overbake another part.

I have found that by combining the normal type of heating or baking of dough products with the generation of heat within the products through the use of high frequency electrical fields, it is possible to proportion the heat applied to the exterior of the dough and the heat applied to the interior of the dough in such manner as to afford the most advantageous conditions for properly baking every portion of the products.

Another object of the present invention is to provide a method and apparatus for baking dough by means of which the time required for baking the material is substantially reduced. I have discovered that by generating heat within the dough undergoing baking simultaneously with the usual application of heat exteriorly the total time required for baking the products may be very substantially lessened, frequently being reduced one-half, while the products produced are of superior texture.

A further advantage of the apparatus and process of baking dough of the present invention is that it is possible to obtain both an improved texture and shape of the produced products. By the process and apparatus of the present invention it is possible to apply heat to the exterior of the products under ideal conditions for the formation of the desired outer crust. In the ordinary process of baking it is seldom possible to apply heat to the dough products in the manner desired for producing the best outer crust as such a procedure will result in a soft or soggy or crystallized inner condition in the bakery piece, and previous to the present invention to baking of dough products has involved the necessary compromise between the conditions best adapted for baking the interior and exterior of the products. By the method and apparatus of the present invention an independent regulation of the baking of the interior and crust of the bakery products is accomplished so that all portions of these products may be baked under the most ideal conditions.

Another advantage of the method and apparatus of the present invention is that by combining the normal exterior type of baking with the generation of heat within the dough by high frequency fields it is possible to effect an improved control or regulation of the baking process. In the baking industry it is always desirable to produce a proper crust and color and texture and to regulate the rise or fall of the products and the spread of the products. The process and apparatus of the present are effective in these respects in producing superior products.

I have further found that the relative durations of the ordinary and frequencies heatings may be varied to obtain improvements in bakery products. In the preferred method and apparatus of the present invention, the dough products move continually through a baking chamber which is heated by hot gases so that baking of the exterior of the dough products takes place and the frequency type of heating is also applied in said chamber but only after the dough has passed for a regulated period of time through the chamber. In general, the application of the frequency heating results in rapid expansion and spread of the products while the application of the heat exteriorly to the products tends to solidify the surface and prevent the expansion. It is thus possible by the new process of the present invention, through proper proportioning of the relative amounts of the application of the two types of heating, to produce bakery pieces of heretofore unheard of dimensions and in many cases of considerably improved quality.

Another object of the present invention is to provide a method and apparatus by which the difficulties heretofore interfering with the application of frequency heating to dough products are eliminated. In attempting to generate heat within a dough product by frequency heating the spacing between the electrodes is a critical factor since the electrodes cannot be too close to each other or to the products to be baked or they will either give rise to carbonization of the product or ionization of the intervening air or gases, resulting in arcing. However it is extremely desirable to have the electrodes as close together as possible since the amount of heating obtainable from a given generator varies inversely as the square of the distance between the electrodes. Considerable difficulty is experienced when frequency heating is applied to dough products for the reason that said dough products contain considerable moisture and also salt, common table salt being an ingredient of almost all bakery products. The application of frequency heat to dough products has heretofore resulted in the distillation and condensation of a salt-laden moisture onto the metallic surfaces of the electrodes, giving rise to ionization and carbonization and sometimes a visible electric arc. Accordingly either the product is destroyed or the generator damaged, or both. Previous to the present invention, this condition had to be corrected by cutting off power from the equipment and cleaning the electrodes. I have found that forced circulation through the frequency heating zone of hot gases not only serves as a means for heating the exterior or crust of the dough products to be baked, but also beneficially influences the frequency heating system in that the moisture-laden gases arising from the products are carried away by the hot gases and are constantly replaced by dry air or dry gases. In this manner the difficulty commonly experienced in heating dough by frequency heating due to condensation on the electrodes of vapors from the products is eliminated. By the process and apparatus of the present invention the electrodes may be placed closer together without fear of carbonization, ionization or arcing, and the efficiency of the heating process materially improved.

I have further discovered that frequency heating may best be combined with the ordinary exterior type of baking by conducting the baking operation in an oven through which the exterior heat is to be applied while advancing the dough products through the oven continually on a traveling metallic band which serves simultaneously as a support for the products to be baked and also as one of the electrodes of the frequency heating system.

A further important feature of the present invention is the utilization of an open or grid type electrode as one of the electrodes of the system. The use of an open or grid type electrode permits the necessary ingress and egress and general circulation of heat and hot gases around the electrodes and products, thus assisting in removal of the salt-laden vapors from the dough products. The use of a travelling metallic band jointly as a support for the dough products to be baked and as an electrode of the frequency heating system makes it possible to regulate the baking operation by varying the speed of travel of the metallic electrode which provides a more effective control of the baking region than can be accomplished by attempting to regulate only the amount of heat supplied to the oven.

The method and apparatus for baking dough of the present invention will be fully understood from the following description of the preferred form or example of the invention. I have therefore described in connection with the accompanying drawing the preferred form of the method and apparatus of the present invention, particularly as the method and apparatus of the present invention is designed for the purpose of baking small bakery products, such as cookies, and the like. I have also illustrated the process and apparatus of the present invention as embodying the combination with the frequency heating system of a baking oven using heated gases from combustion since I have found this to be the preferred form of the invention.

However, in certain cases it may be desirable to combine other means of heating the exterior of the dough products, such as infrared heat rays, with the frequency type of heating.

In the drawings:

Figure 1 is a front elevation of the apparatus partially in section, with certain parts shown diagrammatically.

Figure 2 is a fragmentary plan view, mainly illustrating the grid type of electrodes employed.

Referring to the drawings, 2 generally indicates the walls of an enclosed oven which may be heated in any usual or preferred manner. In the example of the invention given, the oven is provided with a combustion chamber 3 at its upper end. A source of gas 4 leads to a gas burner 5 within the combustion chamber and a blower 6 is employed for forcing air into the combustion chamber. From the combustion chamber 3 a suction fan 7 forces the hot gases through ducts 8 into a pair of vertically spaced apart distributing ducts 9 and 10, the upper duct 9 having openings in its lower face for distributing the heated gas downwardly and the lower duct 10 having openings in its upper face for distributing the heated gas upwardly.

11 indicates an exhaust pipe leading from the oven 2. Openings 12 and 13 are provided in the end walls of the oven housing 2 and an endless metal band 14 or conveyor passes through the opening 12 through the oven between the two heating ducts 9 and 10 and out the opening 13. The band 14 is trained around rolls 15 and 16, one of which is driven as indicated at 17. One function of the band 14 is therefore to act as a conveyer for conveying dough products to be baked through the oven. The band 14 may be a thin solid sheet of metal, or an apertured metallic band, or be built up in any desired manner by linking together different metallic plates. At one end of the oven suitable means is indicated at 18 for feeding the dough products onto the band and at the other end a stripping plate 19 is indicated for removing the produced products from the band.

In addition to serving as a conveyor, the metallic band 14 is also made to act as a grounded electrode of a high frequency heating system. For this purpose a brush 20 is indicated as connected to a ground line 21 and positioned to provide good electrical contact with the metallic band 14. Preferably the line of contact of the brush 20 is close to the center of the other electrode of the high frequency heating system. The other electrode of the system is preferably in the form of a grid 22 formed by a network of conductors spaced just above the metallic band 14 the minimum distance which will assure safe clearance of the baked products being conveyed by the band underneath said grid 22.

In the preferred method and apparatus of the present invention, the grid 22 covers only a portion of the band 14 in the oven. The relative position of the grid 22 with respect to the inlet to the oven may be varied in accordance with the results to be effected on baking different products. For many products I have found it best to position the grid 22 slightly after the inlet into the oven, the distance being just enough to allow the surface of the band and the exterior of the dough products undergoing baking on the band to be heated to a suitable baking temperature before the frequency heating is applied to the dough. By applying the frequency heating to the dough just after the band and dough have been raised to the baking temperature, and before a pronounced crust is formed upon the dough, the desired expansion of the dough products is best attained. By the process and apparatus of the present invention, on the application of the frequency heating to the warm dough on the band the rising of the dough occurs almost instantly, whereas this action normally may require a considerable period of time when the dough is baked in the usual manner. The grid is omitted from the portion of the band 14 near the outlet as this portion of the oven is mainly for the purpose of developing the desired crust on the products.

The two electrodes, the grid 22 and the metallic band 14 are connected by leads 23 with an apparatus 24 for generating the desired electrical energy. The electrical energy is preferably a short-wave radio frequency. For example, I have generally employed a frequency of 28 megacycles although obviously electrical engineers will recognize that various other frequencies are suitable for similar generation of internal heat within the dough products to be baked. Any apparatus suitable for generating a high frequency electrical energy is suitable and the output of such apparatus generally indicated at 24 is connected by lines 23 to the two electrodes 22 and 14.

The preferred process and apparatus of the present invention has been used for the baking of cookies, although not necessarily confined thereto. Previous to the use of the method and apparatus of the present invention, the ovens employed in baking cookies required from about 7 to 11 minutes' baking time. By the method and apparatus of the present invention the baking time is reduced to 1½ to 4 minutes, allowing the length of the oven to be reduced to half, or permitting doubling of the capacity of the same apparatus through increasing the rate of travel of the means for conveying the cookies through the oven.

When, as illustrated in the example of the invention described in connection with the drawings, the frequency type of heating of the dough products is accomplished by the forcing of hot gases over the products, not only is there produced the desired control of the exterior crust of the products to be produced from the heat applied by such gases, but such gases act upon the frequency heating system in a highly beneficial manner in moving the distillate driven over the dough products and preventing the same from condensing and collecting upon the electrodes with the result that the frequency type of heating is thus successfully applied to bakery products without the necessity of frequent cleaning of the electrodes and moreover the electrodes may be positioned as close together as the size of the products passing therebetween permit without substantial danger of arcing or other difficulties, considerably improving the ease and economy of the application of heat by frequency heating.

In the use of the method and apparatus of the present invention in baking cookies individual quantities of dough suitable for forming individual cookies are distributed over the metallic band 14 at the inlet end 12 of the oven and passed through the oven by the process and apparatus previously described. Previous to the use of the method and use of the present invention considerable difficulty was encountered in suitably baking the interior of the cookies without the formation of an unduly hard or carbonized crust upon the cookies, or the use of undue, undesirable long baking periods, reducing the capacity of the apparatus. By employing the travelling metallic band 14 as one electrode of a high frequency system of generating heat within the dough itself and combining this method of heating with the ordinary oven heating, difficulties in securing uniform heat through the cookies rapidly disappeared. Moreover, by combining the two forms of heat not only is a suitable crust placed on the products, such as will allow the products to be readily handled and packaged, but a superior product is produced over that resulting from baking dough entirely by electrical power.

In the use of the method and apparatus of the present invention the operator will frequently find it of advantage to use higher baking temperatures than is normally employed. High baking temperatures must be avoided in the normal baking operations because the crust will become carbonized before the interior of the product is properly baked. But with the independent heating of the interior of the products by the frequency heating system the process and apparatus of the present invention allows high baking temperature to be applied in the oven, effecting a still further reduction in the time required for baking and in the size of the apparatus required.

While the particular example herein described of my method and apparatus for baking is well adapted for carrying out the objects of the invention, it is to be understood that various changes and modifications may be made without departing from the principles of the present invention, and this invention includes all such modifications and changes as come within the scope of the appended claims.

I claim:

1. An apparatus for baking dough products which comprises a heating chamber, a travelling metallic band movable through said chamber for supporting the dough products to be baked, means for heating the gases surrounding the exterior of the dough products and metallic band within said chamber, a grid electrode disposed over said metallic band, and a high frequency generating means for generating heat within the dough products within said chamber and connected to said grid electrode and to said metallic band, said metallic band thus acting as an electrode of the high frequency heating means.

2. An apparatus for baking dough products which comprises a heating chamber, a travelling metallic band movable through said chamber for supporting the dough products to be baked, means for applying heat to the exterior of the dough products within said chamber, a grid electrode disposed over said metallic band, and a high frequency generating means for generating heat within the dough products within said chamber and connected to said grid electrode and to said metallic band, said metallic band thus acting as an electrode of the high frequency heating means, the means for heating the exterior of the dough products including means for forcing hot gases through said chamber and between said electrodes.

3. An apparatus for baking dough products which comprises a heating chamber, means for advancing a metallic band into and out of said chamber, said band serving to support and transport dough products to be baked, gas distributing ducts in said chamber below and above said band, means for passing hot gases through said ducts, means for exhausting gases from said chamber, and an electrode placed over said band, and a source of high frequency energy connected to said band and to said electrode for generating heat interiorly of dough products on said band.

4. An apparatus for baking dough products which comprises a heating chamber, means for advancing a metallic band into and out of said chamber, said band serving to support and transport the dough products to be baked, gas distributing ducts in said chamber below and above said band, means for passing hot gases through said ducts, means for exhausting gases from said chamber, and an electrode placed over said band and a source of high frequency energy connected to said band and to said electrode for generating heat interiorly of dough products on said band, said electrode placed over said band being of the open grid type to facilitate circulation of gases.

5. An apparatus for baking dough products which comprises a heating chamber, means for advancing a metallic band into and out of said chamber, said band serving to support and transport dough products to be baked, gas distributing ducts in said chamber below and above said band, means for passing hot gases through said ducts, means for exhausting gases from said chamber, an electrode placed over said band, and a source of high frequency energy connected to said band and to said electrode for generating heat interiorly of dough products on said band, said electrode being placed at a distance from the outlet end of said heating chamber.

6. An apparatus for baking dough which comprises means forming an enclosed chamber, a travelling metallic band movable through said chamber for supporting on its upper surface dough products to be baked, means for heating gases, means for forcing said gases to circulate through and out of said chamber so as to heat said metallic band and heat and contact the dough particles thereon, a grid electrode spaced above said metallic band a distance suitable to clear the dough particles, and means for generating alternating frequency connected to said band and to said grid electrode.

7. An apparatus for baking dough while placing a crust thereon which comprises means forming an enclosed chamber, a travelling metallic band movable through said chamber and adapted for the support on its upper surface of the dough products to be baked, a grid electrode disposed over said band but spaced therefrom a distance sufficient to clear the dough particles throughout the baking operation, means for heating gases, means for forcing the gases to circulate through and out of said chamber and around the band and dough products thereon, high frequency generating means, and means for connecting said high frequency generating means to said grid and to the band and to said travelling metallic band.

JOHN HENRY NUTT.

REFERENCES CITED

The following references are of record in the file of this patent:

UNITED STATES PATENTS

| Number | Name | Date |
|---|---|---|
| 1,394,706 | Beanes | Oct. 25, 1921 |
| 1,900,573 | McArthur | Mar. 7, 1933 |
| 2,042,145 | Darrah | May 26, 1936 |
| 2,068,799 | Guyer | Jan. 26, 1937 |
| 2,140,337 | Somes | Dec. 13, 1938 |
| 2,224,634 | Holtzman et al. | Dec. 10, 1940 |
| 2,231,457 | Stephen | Feb. 11, 1941 |
| 2,325,652 | Bierwirth | Aug. 3, 1943 |
| 2,327,727 | Loose et al. | Aug. 24, 1943 |
| 2,340,354 | Wells | Feb. 1, 1944 |
| 2,388,824 | Brown | Nov. 13, 1945 |
| 2,390,572 | De Brabander | Dec. 11, 1945 |

FOREIGN PATENTS

| Number | Country | Date |
|---|---|---|
| 104,868 | Australia | Aug. 17, 1938 |

OTHER REFERENCES

Product Engineering, page 92, July 1944.